April 14, 1959 H. H. RUSSELL 2,882,038
LARGE-CAPACITY BALANCE
Filed June 10, 1955 2 Sheets-Sheet 1
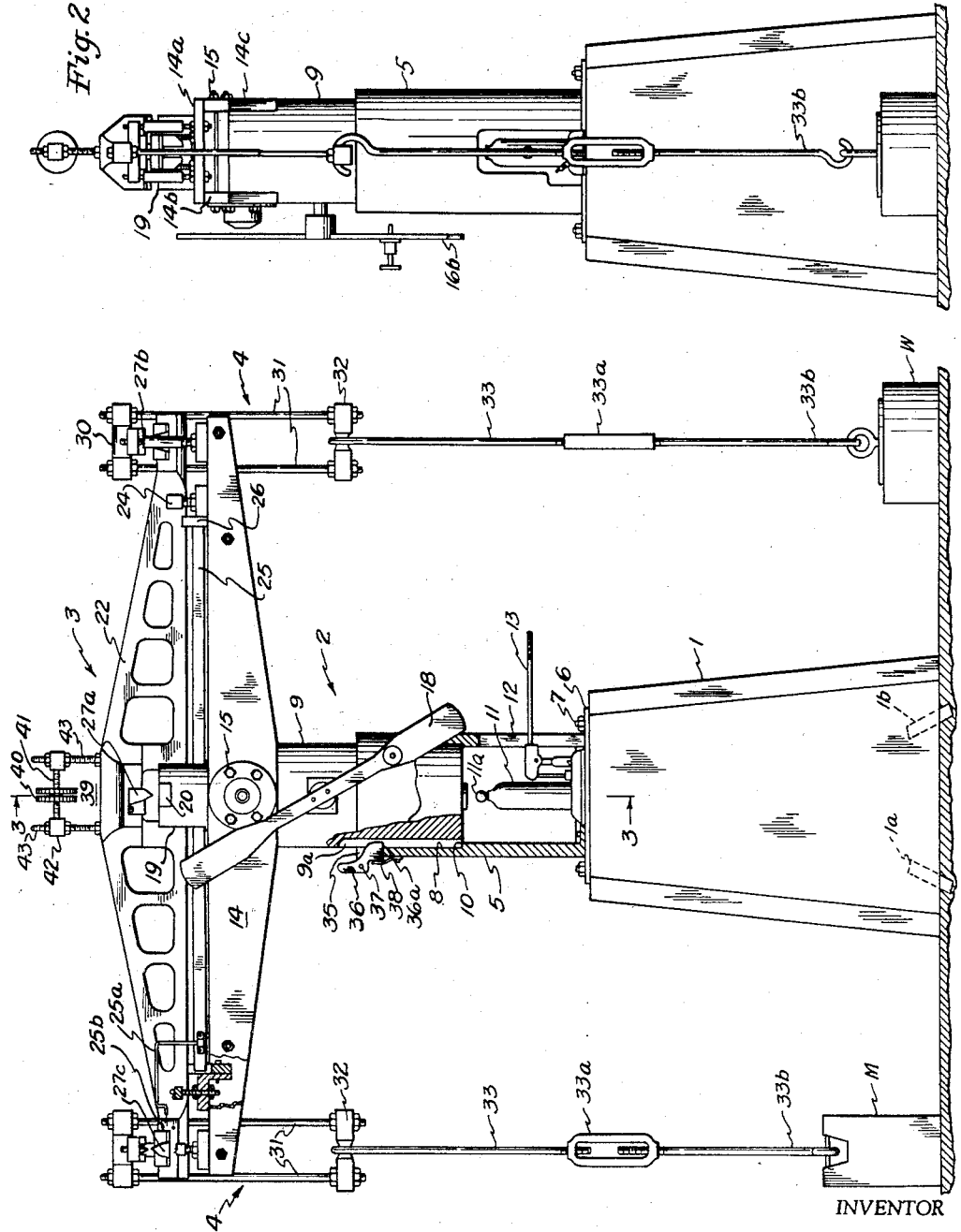
INVENTOR
Henry H. Russell
BY
Arthur Vinograd ATTORNEY
Leonard F. Stoll AGENT

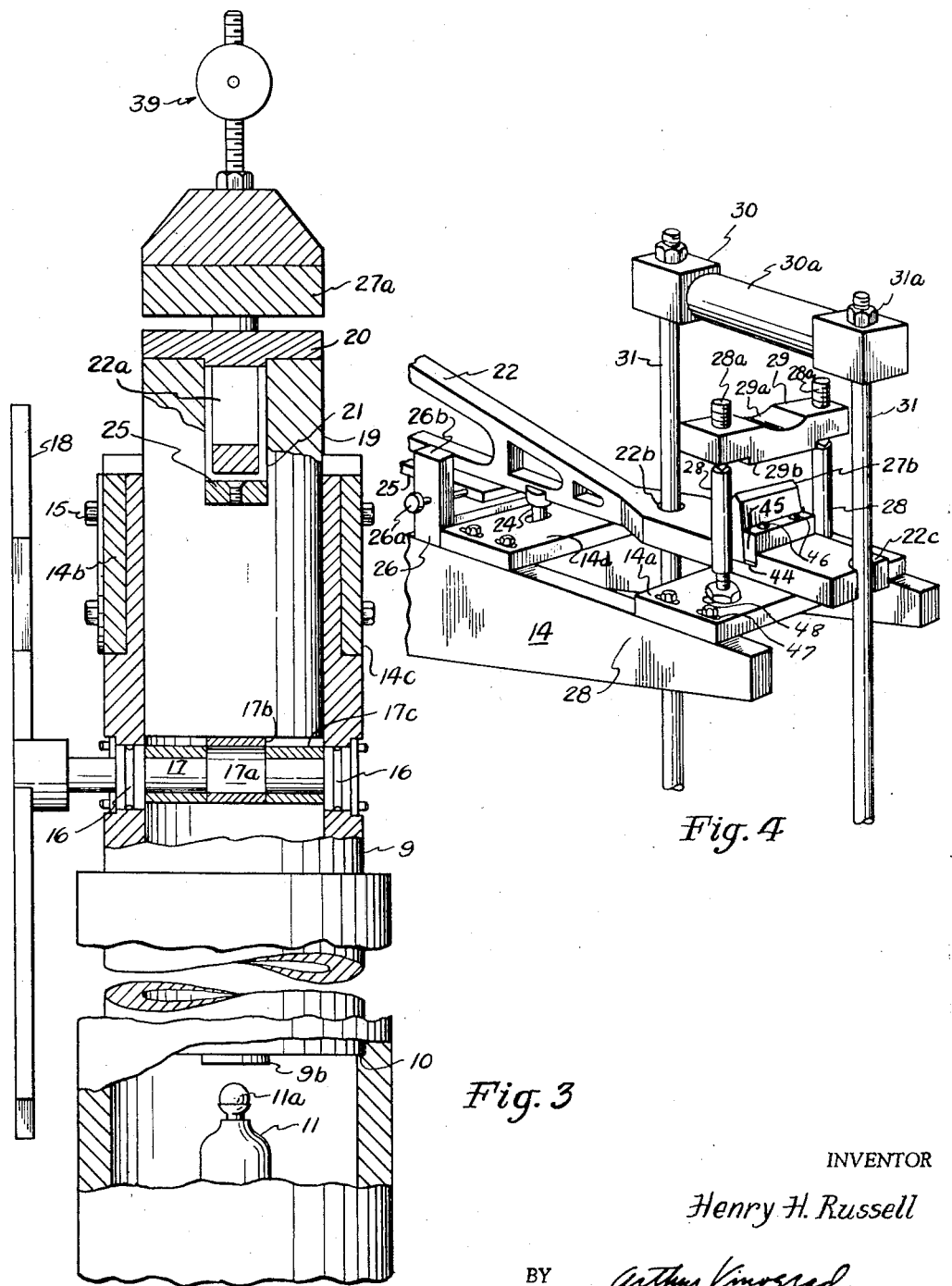

United States Patent Office 2,882,038
Patented Apr. 14, 1959

2,882,038

LARGE-CAPACITY BALANCE

Henry H. Russell, Arlington, Va., assignor to the United States of America as represented by the Secretary of Commerce Application June 10, 1955, Serial No. 514,795

9 Claims. (Cl. 265—54)

This invention relates to the art of force and mass measurements and particularly contemplates an improved balance adapted for the accurate calibration of relatively large test weights. The necessity for preserving uniformity of weights and measures in industry and commerce has resulted in establishment of a precise standard normally kept at the National Bureau of Standards. It is therefore necessary to provide means for accurately calibrating working standards against a master standard for subsequent distribution to various regional areas. Because of the expansion of the highway trucking industry it becomes especially important to accurately calibrate the highway vehicle scales, which are extremely large in both capacity and length, now employed by the various state governments and others. The accuracy of these scales is a matter in which weights and measures regulatory agencies are directly concerned.

In calibrating relatively large weights such as are employed in scales of this type, the problem arises of handling large masses on weighing beams provided with extremely accurately positioned and delicate pivots, and despite the large size and general ruggedness of construction of the weighing scale employed, the pivots and bearings severely limit the amount of shock and weight handling abuse which the balance can safely withstand.

In vehicle-scale installations, existing several years ago, groups of 50-pound test weights were commonly employed for testing but it has been found as the result of extensive tests conducted by the National Bureau of Standards that such test weights are not sufficiently large to disclose the true magnitude of ratio errors of scales in good condition and too small to reveal inaccuracies resulting from faulty conditions of scales in bad condition. As a result of such investigations the National Conference on Weights and Measures has recommended the use of large, accurately calibrated 500 and 1000-pound test weights to provide means where large scales can be effectively and more efficiently tested.

The test weights must be standardized by accurate calibration before they are placed into service and periodically thereafter. The adjustment tolerance for a 1000-pound class C test weight is ±1 ounce but very few field activities have suitable equipment for standardizing weights larger than 50 pounds. While the NBS has facilities for calibrating test weights up to 10,000 pounds, the balance employed in such large weight calibrating is such as to require repeated weighing and depends largely upon the skill of the operator. The scale comprising the present invention has therefore been designed to provide for the rapid calibration of large weights to the specified accuracy in a manner whereby damage and wear to the balance as a result of handling large weights is minimized and which facilitate the handling of large masses without undue burden to the operator.

It is therefore a primary object of this invention to provide a balance capable of handling relatively large weights in a manner that minimizes the danger of damage to the scale.

A further object of this invention is to provide an equal-arm balance which combines extreme ruggedness of construction with a high degree of sensitivity in a manner which facilitates the rapid and accurate handling of large weights for calibration purposes.

An additional object of this invention is to provide a weighing scale construction, in which the weighing elements are maneuverable in a manner which permits the efficacious handling of large weights without danger of shock to the weighing mechanism during application and removal of the weights, and especially facilitates the use of transposition weighing methods.

Other uses and advantages of the invention will become apparent upon reference to the specification and drawings in which:

Fig. 1 is an elevation of the weighing scale;

Fig. 2 is an end view of the weighing scale shown in Fig. 1;

Fig. 3 is a sectional view taken on line 3—3 of Fig. 1; and

Fig. 4 is an enlarged view of a portion of the weighing scale showing the load transfer mechanism.

The present invention attains the above objectives by providing a maneuverable weighing device in which means are provided for normally rigidly supporting the weighing beam on a supporting cradle, the cradle in turn being adapted to be rotated on its support so as to present the weight suspension members to the weights being calibrated in a manner that facilitates transfer of the weights to the balancing beam with negligible shock. In addition a compound weight transferring mechanism is provided which permits the weights to be transferred in sequence to the cradle support and then to be suspended on the balance beam.

In accordance with the principles of this invention, the weights are placed in a fixed position on the floor or support where the device is mounted and the entire balance is lowered until weight supporting hooks engage the weights; the entire balance is then raised to suspend the weights above the floor.

Referring to the drawings, the weighing scale comprising the present invention is shown in Figs. 1 and 2 as being mounted on a pedestal 1 which may comprise a rigid concrete pedestal. The pedestal is in turn rigidly imbedded in a concrete foundation by means of the staking pins 1a, 1b. The balance comprises a central support 2 which adjustably supports a weighbeam and relieving gear assembly 3, the ends of which are provided with weight hanger assemblies 4—4.

The support generally designated by reference numeral 2 comprises a rigid guide cylinder 5 which is securely fixed to the pedestal 1 by means of a supporting flange 6 and anchor fastenings 7. The upper portion of the cylinder has an enlarged bore portion 8 for slidably and rotatably accommodating a supporting post or piston 9. The intersection between the lower and upper bores of the cylinder defines an annular shoulder 10 which provides a stop and rest for the supporting post 9 when it it in its rest position. An elevating mechanism which may preferably be in the form of a hydraulic jack 11 or other power device is securely fastened to the pedestal within the lower bore of the guide cylinder 5 and a portion of the guide cylinder is provided with an access opening or slot 12 through which the operating handle 13 of the lifting device projects. A ball bearing assembly 11a cooperating with a pad 9b on the lower face of the supporting post or piston 9 permits the entire balance assembly to be rotated as will be described.

As shown in Fig. 1, the upper end of the guide cylinder 5 is provided with a slot 35 having a pair of projecting lugs in which a latch 36 is pivoted by means of a pin 37. One end 36a of the latch is normally biased by a spring 38 to project through the slot 35 into proximity with a longitudinal groove 9a which is milled in the surface of the cylindrical supporting post or piston 9. Two such grooves 9a diametrically arranged with respect to each other are provided in the supporting post, providing a means together with the latch 36, for indexing the post and the beam assembly 3 between positions 180° apart with precision.

The weighing mechanism comprises a rigid supporting cradle 14 which is securely fastened to the upper end of the supporting post or piston 9. The construction of the cradle is more clearly shown in Fig. 2 as comprising a generally U-shaped truss having a discontinuous top platform and continuous side flanges 14b, 14c. The upper portion of the supporting post 9 is suitably milled to provide a pair of oppositely disposed flats as shown in Figs. 2 and 3 to which the side flanges of the beam are securely clamped by means of the screw fastenings 15.

The supporting post or piston 9 is transversely bored to provide a pair of spaced bearings 16—16 as shown in Fig. 3 for rotatably supporting an eccentric shaft 17. The eccentric shaft 17 includes an eccentric 17a having a bearing 17b and a projecting portion which extends outwardly through the post 9 and is provided with an operating lever 18. Suitable bearing sleeves 17c are provided as indicated in Fig. 3 for the eccentric shaft.

A plunger 19, is slidably mounted within the supporting post 9 as shown in Figs. 2 and 3, and the bottom surface of the plunger is adapted to bear against the roller-bearing 17b on the eccentric 17a. It is apparent therefore, that actuation of the operating lever 18 will cause the eccentric 17a of the eccentric shaft to raise and lower the plunger 19 relative to the supporting post 9 for a purpose to be described.

The upper end of plunger 19 is provided with a transverse slot in which a hardened steel fulcrum bearing 20 is seated as shown in Figs. 1 and 3. The fulcrum bearing provides a bearing surface for the center knife-edge fulcrum pivot 27a. The upper end of the plunger 19 is also slotted as shown at 21 to provide a clearance or passage to accommodate the weighbeam 22 to be described.

The weighbeam 22 comprises a rigid member which, when in operative position, is cantilevered on the central support assembly 2 by means of the center fulcrum knife-edge pivot 27a. In its inoperative position, the weighbeam 22 is securely supported on the rigid cradle 14. Referring to Fig. 1, the weighbeam 22 is shown in position on the plunger 19. A portion of the beam is accommodated in the slot 21 as shown in Fig. 3, the web of the beam being provided with a discontinuous portion 22a providing clearance for the transversely disposed fulcrum bearing 20. The upper portion of the weighbeam 22 extends upwardly over the plunger 19 as shown in Fig. 1.

As is further detailed in Fig. 4, and in the left side of Fig. 1 a platform portion 14d of the cradle 14 is provided with a plurality of beam arrestment posts 24 which are arranged at each end of the cradle and in straddling arrangement with the lower surface of the weighbeam 22. The arrestment posts are provided with seating surfaces as shown for carrying the weight of the balancing beam when in an arrested position.

An alignment bar 25 is provided coextensive with the lower surface of the weighbeam 22. As shown in Fig. 3, the alignment bar is rigidly fastened to the base of the slot 21 in the plunger 19 and the opposite ends of the bar extend into proximity with the ends of the weighbeam as shown in Fig. 1. The purpose of the alignment bar is to prevent rotation of the plunger 19 relative to the post or piston 9. In this manner positive alignment of the various cooperating members carried by the balancing beam 22 and the cradle 14 is obtained.

An alignment bar adjustment block 26 (see Fig. 4) is provided adjacent each end of the alignment bar. The adjustment block is in the form of a U-shaped member having a base secured to the top surface of the cradle 14, and a pair of upstanding arms 26b (only one of which is apparent in Fig. 4) which straddle the opposite sides of the alignment bar. Each of the upstanding arms of the adjustment block is provided with an adjusting screw 26a for centering the alignment bar, and hence the balancing beam.

One end of the alignment bar 25 is provided with an index pointer 25a which cooperates with a register scale 25b fixed to an end of the weighing beam as shown in Fig. 1.

As shown in Figs. 1 and 4, each end and the center of the weighbeam 22 is provided with knife-edge fulcrum pivots 27a, 27b, and 27c, respectively, which are secured to the beam by means of a wedge arrangement. One side face of the fulcrum pivot is suitably tapered and ground to provide a 75° slope and, as is more clearly illustrated in Fig. 4, both sides of each terminal pivot are likewise ground to a taper. The pivot ways 44 in the weighbeam 22 are milled in the form of a keyway or slot of exaggerated width. The knife-edge pivot such as 27b is adjustably secured in the slot by a wedge 45 having one side perpendicular to its upper surface and one side which is ground to an angle corresponding to the described slope on the pivot. A plurality of adjusting screws 46 are provided in the wedge and are threaded into the weighbeam. In this manner, the terminal knife-edge pivots 27b and 27c may be precisely adjusted to define equal moment arms about the center knife-edge pivot 27a. Furthermore, such knife-edge pivots may be aligned in exact parallelism by manipulating each of the screw fastenings 46 differing amounts to cant the knife-edge within the respective seating slot 44. The referred-to top surface portion 14a of the cradle 14 is provided with a pair of load-bearing arrestment posts 28—28 at each end which are arranged to straddle the corresponding end of the weighbeam. A load-bearing block 29 is supported on the upper ends of arrestment posts as shown in Fig. 4 in alignment with each of the knife-edge pivots 27a, 27b, 27c by means of a pair of arrestment adjusting screws 28a—28a the lower ends of which are conically shaped for nesting engagement with countersunk portions provided in the upper ends of the bearing arrestment posts 28. The lower surface of the block 29 is provided with a hardened special alloy steel insert 29b and the upper surface has a transverse hollow portion 29a which provides a bearing seat for the round bearing portion 30a of an upper equalizer bar 30. The opposite ends of the equalizer bar 30 are rectangular in shape and are suitably bored to receive the ends of a pair of suspension studs 31—31 comprising the weight hanger assembly 4. These studs are suitably threaded and are fastened to the equalizer by lock nuts 31a. Because of such construction positive duplication of pivot-bearing contact is assured in all weighing operations. For purposes of clarity, the upper equalizer bar 30 is shown separated from the bearing block 29. However, as shown in Figs. 1 and 2, the shank 30a of the equalizer bar normally rests in the bearing seat 29a and is suspended on the bearing block 29.

The surface portion 14a which supports the arrestment posts 28 is adjustably secured to the side flanges of the supporting cradle 14 by a slot and screw fastening connections such as 47—48. In this manner the points defining the seats between the arrestment adjustment screws 28a and the load bearing arrestment posts 28, are coplanar with a vertical plane through the knife-edge perpendicular axis and the bearing block 29.

As is apparent from Fig. 4, each end of the weighbeam 22 is suitably bored as indicated at 22b and 22c to provide clearance passages for the downwardly extending portions of the suspension studs.

Because of the described construction, swinging of the load weights when in a suspended position has little wearing effect on the knife-edge pivots 27a—27c. Since the bearing portion 30a of the upper equalizer bar 30 will, in such event, ride in the transverse bearing seat 29a, there is little tendency for the bearing block 29 to rock on the knife edge pivots. Moreover, the adjustability provided by the threaded arrestment posts 28 and the described fastenings 47—48 permits orientation of the upper equalizer bar 30 and the load-bearing block 29 with respect to the respective knife edge pivot so that the line of suspension of the load lies true through the vertical axis of the knife-edge pivot such as 27b thus preventing improper rotation of the bearing and eliminating any tendency for the bearing to slip along or across the knife-edge pivot.

A balance assembly 39 comprising an adjustable weight 40 is provided on top of the center portion of the weighing beam 22 as shown in Fig. 1. To provide sufficient flexibility of adjustment, the weight 40 is mounted on a transverse threaded shaft 41 which, in turn, is carried by a pair of blocks 42—42 which are mounted on a pair of adjustment studs 43—43. In this manner, the weight 40 can be accurately positioned vertically and longitudinally with respect to the center of oscillation of the weighing beam.

Referring to Fig. 1, it will be apparent that each pair of suspension studs 31 form the hanger assembly for the weights M and W. Preferably, the lower end of each suspension stud is suitably threaded and lower equalizer bars 32, 32 are secured thereto by suitable lock nuts as shown. The lower equalizer bars form suspensions for the weight hangers 33, 33 each of which includes an adjustable turnbuckle 33a and a lower load engaging hook 33b or other weight-engaging and supporting means. By virtue of such construction, the hangers can readily be engaged with the weights M or W positioned respectively beneath each of the hangers, by loosening the turnbuckles until the hook member 33b can be threaded into the eye bolt provided on the weights. The turnbuckles are then tightened only enough to take up the slack in the hanger elements, but insufficiently to raise the weights from the floor in order to insure subsequent simultaneous elevation of the weights as will be described. Such described construction obviates the need for manipulating the weights onto the weighbeam and, because of the indexing mechanism, the weights may readily be interchanged with respect to the weighbeam by rotating the entire weighbeam assembly 3 while the weights are resting on the floor. The disclosed arrangement of the upper equalizer bar 30, the lower equalizer bar 32 and the load-bearing block 29 moreover, facilitates alignment of the load produced by the weights when suspended so that the thrust is applied directly to the center of the knife-edge pivots 27a, 27b, and 27c.

*Operation*

In the normal inoperative position of the balance, the supporting post or piston 9 is seated on the shoulder 10 as indicated in Fig. 3. Since the latch 36 securely fixes the supporting post 9 against rotation relative to the guide cylinder 5, it will be apparent from a consideration of Figs. 1 and 3 that the cradle 14 is rigidly anchored to the pedestal 1. Furthermore, when the plunger 19 is in its lowered position, the weighbeam 22 is rigidly seated on the arrestment posts 24 on the cradle. Such position of the mechanism is illustrated in Fig. 4 and it will be apparent that the three knife-edge pivots 27a, 27b, and 27c on the weighbeam are isolated from the weight-suspending members. That is, the three knife-edge pivots are effectively separated from their respective bearing surfaces 29b and 20.

Actuation of the elevating mechanism 11 (Fig. 1) will raise the supporting post or piston 9 with consequent elevation of the cradle 14. As is apparent from Fig. 4, elevation of the cradle 14 will simultaneously raise the three-load bearing blocks 20, 29 carried by each end of the cradle and in the center of the plunger 9. The weighbeam 22 is simultaneously elevated by such actions. The vertical spacing between the lower surface of each of the bearing blocks 29, and the center bearing member 20 and the respective knife-edge pivots 27a, 27b, and 27c is such that the referred-to separation between the pivots and bearings will remain constant during this operation. The effect of such movement is to elevate the upper weighbeam and relieving gear assembly 3 and transfer the load of the weights M and W from the floor to the rigid cradle 14 while the knife-edge pivots 27a, 27b, and 27c remain isolated from any loading effects.

For a weighing operation, the operating lever 18 on the eccentric shaft 17 is rotated to additionally elevate the plunger 19 with respect to the supporting post or piston 9. Since such manipulation also raises the plunger 19 relative to the already elevated but rigid cradle 14 it will be apparent from Fig. 3, that the fulcrum bearing 20 which is carried at the upper end of the plunger 19 will engage against the knife-edge fulcrum pivot 27a fixed to the medial portion of the weighbeam 22 as shown in Figs. 1 and 3 and will displace the weighbeam 22 relative to cradle 14. The effect of such manipulation is to raise the weighbeam from seated engagement with the arresting stops 24 and to cause the load or weight-carrying knife-edge pivots 27a, 27b to engage against and elevate the respective load-bearing blocks 29. Inasmuch as the arrestment adjusting screws 28a—28a which support the blocks are gravitationally seated in the upper conical seats of the bearing arrestment posts 28—28, the load of the weights is gradually transferred in this manner from the cradle 14 to the weighbeam 22 without shock and the weighbeam 22 is then suspended only by the engagement between the center fulcrum knife-edge pivot 27a and the bearing support 20 on the post.

The advantages of the above-described arrangement are now apparent. In calibrating weights of relative large mass, the problem of applying the weights to the weighbeam becomes significant. Moreover, in calibrating an unknown weight against a standard, it is necessary to interchange the unknown and standard weights with respect to the weighbeam for proper calibration. In operation, the weights are positioned approximately beneath the projection of the terminal knife-edge pivots 27b, 27c of the weighbeam when the apparatus is in its initial inoperative position. With the supporting post or piston 9 and plunger 19 in their lowermost positions the hanger rods 35 are readily engageable with the lower equalizer bars 33 as described. Initial elevation of the supporting post 9 by actuation of the elevating mechanism will cause the assembly 3, as a unit, to elevate the weights from the floor and hold them suspended in the described manner, the load being entirely borne by the cradle 14 through the bearing blocks 29. The sensitive knife-edge pivots 27a, 27b, 27c and the fulcrum bearing surfaces 20, 29 are in this manner isolated from any danger of shock or wear which might arise by conditions of unbalance in the weights, or other accidental movement of the suspended weights. The load produced by the weights may now be gradually transferred to the weighbeam 22 in the manner described, upon actuation of the eccentric shaft 17, and after bringing the two weights M and W into approximate equilibrium, any slight deviations from true balance are indicated by the degree of unbalance registered by the pointer 25a on the scale 25b (Fig. 1).

The load is then gradually transferred back to the cradle 14 by operating the eccentric, following which, the weights may be redeposited on the floor by releasing the elevating mechanism 11.

In order to transpose the weights, with respect to the weighbeam, the latch 36 is released and the entire assembly 3 may be indexed 180° by rotating the support 9 in the cylinder 5 thus assuring that the load suspension points are realigned with the weights on the floor. The previous operations are then performed and additional comparison of the two weights is made.

Because of the described construction, the balance according to this invention is especially adaptable to manufacture in any well-equipped machine shop. A balance of the required high accuracy may be constructed by reasonably skilled machinists who have no special knowledge of scale and balance work. Whereas, in conventional designs, the labor costs involved in adjusting the component parts to secure the required degree of accuracy and sensitivity often exceeds the machining and construction costs, the singular features of the present invention as described obviate the need of elaborate final adjustment operations.

It will be apparent that the embodiments shown are only exemplary and that various modifications can be made in construction and arrangement within the scope of invention as defined in the appended claims.

What is claimed is:

1. A weighing scale comprising a weighbeam having a fulcrum pivot and load supporting pivot means, a rigid support having a fulcrum bearing engageable with said fulcrum pivot and load engaging means aligned with said load supporting pivot means for releasably engaging a load, means for maneuvering said support together with said load engaging means for engaging and suspensively supporting a load which is provided in a fixed position relative to said weighing scale, means on said support for normally supporting said weighbeam in an inoperative position wherein said fulcrum pivot and pivot means are operatively isolated from said fulcrum bearing and load engaging means respectively, and means on said supporting means for suspending said weighbeam in an operative position on said support with said fulcrum pivot engaged with said fulcrum bearing and for concurrently transferring said load from said load engaging means on said support to said load supporting pivot means.

2. The invention as defined in claim 1 in which said maneuvering means comprises means for adjustably mounting said rigid support for rotational and translatory motion and means for translating said support in a direction to cause said load engaging means to suspend said load, with respect to its fixed position.

3. The invention as defined in claim 2 which a plurality of loads may be mounted in fixed positions respectively with respect to said weighing scale and said mounting means includes indexing means for limiting the rotational movement of said support to positions corresponding to the initial fixed positions of said means.

4. A weighing scale comprising a weighbeam having a fulcrum pivot and weight supporting pivot means, a first fixed support, a second rigid support adjustably mounted relative to said first support and having a fulcrum bearing engageable with said fulcrum pivot, means on said second support and aligned with said weight-supporting pivot means for engaging a weight which occupies a fixed position relative to said weighing scale, means on said second support for normally holding said weighbeam in an inoperative position wherein said fulcrum pivot and said weight supporting pivot means are operatively isolated from said fulcrum bearing and weight engaging means respectively, means for moving said second support relative to said first fixed support in a direction to cause said weight engaging means to suspend said weight with respect to said defined fixed position, and means adjustably mounted on said second support and movable relative thereto for suspending said weighbeam in operative position on said second support with said fulcrum pivot engaged with said fulcrum bearing and for concurrently transferring said weight engaging means from said second support to said weight supporting pivot means.

5. The invention as defined in claim 4 in which said weight engaging means comprises a load hanger normally suspended from said second support, said load hanger having disconnectable means adapted to be attached to said weight, and said load supporting means on said weighbeam comprises a pivot bearing adapted to engage said hanger and disconnect said weight and hanger from said second support when said weighbeam is moved to said operative position.

6. The invention as defined in claim 4 in which said second support is adjustably supported relative to said first support by means including an indexing mechanism enabling said second support to be maneuvered relative to said first support to a position corresponding to said defined fixed position of said weight.

7. A weighing scale comprising a weighbeam adapted to be operatively suspended on a fulcrum pivot and having load supporting pivot means, a rigid cradle, a support for said cradle, means for moving said cradle in two directions relative to said support, a bearing means for said fulcrum pivot adjustably mounted on said cradle, load bearing means disconnectably mounted on said cradle in alignment with said load supporting pivot means, seating means on said cradle for normally holding said weighbeam in an inoperative position wherein said fulcrum pivot and pivot means are operatively isolated and in alignment with each of said bearing means, load hanger means normally resting on said load bearing means and having detachable weight engaging means adapted to be connected to a load which is in a fixed position relative to said weighing scale, means for moving said cradle in one direction relative to said support for transferring said load bearing means from said cradle to said weighbeam load supporting pivot means, and means for moving said bearing means relative to said cradle for transferring said weighbeam to said bearing means.

8. The invention as defined in claim 7 in which said disconnectable load bearing means comprises a load bearing block having a first bearing surface aligned with said load supporting pivot and a second bearing seat arranged perpendicularly to a vertical plane through said pivot, said load hanger means comprising a bearing member mounted on said second bearing seat.

9. The invention as defined in claim 7 in which plurality of weights are mounted in fixed positions relative to said weighing scale and means are provided for indexing said cradle and weighbeam in a second one of said directions relative to the support whereby said load hangers may be aligned with said fixed positions occupied by said weights.

References Cited in the file of this patent

UNITED STATES PATENTS

| | | |
|---|---|---|
| 139,372 | Cyrani et al. | May 27, 1873 |
| 1,583,883 | Heusser | May 11, 1926 |
| 2,581,807 | Mettler et al. | Jan. 8, 1952 |
| 2,752,146 | Hodsman | June 26, 1956 |

FOREIGN PATENTS

| | | |
|---|---|---|
| 1,432 | Great Britain | 1876 |

OTHER REFERENCES

Ser. No. 415,981, Popov (A.P.C.), published June 8, 1943.